US010477760B2

(12) United States Patent
Bassett (10) Patent No.: US 10,477,760 B2
(45) Date of Patent: Nov. 19, 2019

(54) AGRICULTURAL ORGANIC DEVICE FOR WEED CONTROL

(71) Applicant: Underground Agriculture, LLC, Sycamore, IL (US)

(72) Inventor: Joseph D. Bassett, Sycamore, IL (US)

(73) Assignee: Underground Agriculture, LLC, Sycamore, IL (US)

(*) Notice: Subject to any disclaimer, the term of this patent is extended or adjusted under 35 U.S.C. 154(b) by 73 days.

(21) Appl. No.: 15/392,731

(22) Filed: Dec. 28, 2016

(65) Prior Publication Data

US 2017/0181373 A1 Jun. 29, 2017

Related U.S. Application Data

(60) Provisional application No. 62/271,770, filed on Dec. 28, 2015.

(51) Int. Cl.
*A01D 34/66* (2006.01)
*A01M 7/00* (2006.01)
*A01M 21/04* (2006.01)

(52) U.S. Cl.
CPC ......... *A01D 34/662* (2013.01); *A01M 7/0025* (2013.01); *A01M 21/043* (2013.01)

(58) Field of Classification Search
CPC .. A01M 21/043; A01M 7/0025; A01M 21/02; A01D 34/662; A01D 34/44; A01D 34/62; A01D 34/64; A01D 34/661; A01D 34/863; A01D 41/148; A01D 45/10; A01D 75/30; A01D 75/303; A01D 75/306; A01G 3/00
See application file for complete search history.

(56) References Cited

U.S. PATENT DOCUMENTS 114,002 A 4/1871 Godfrey
321,906 A 7/1885 McCormick
(Continued)

FOREIGN PATENT DOCUMENTS

BE 551372 10/1956
CA 530673 9/1956
(Continued)

OTHER PUBLICATIONS

Gason, http://www.fatcow.com.au/c/Gason/Three-row-vineyard-mower-a-world-first-p23696, 3 row vineyard mower brochure PDF, Jul. 2010.*
(Continued)

*Primary Examiner* — Alicia Torres
*Assistant Examiner* — Adam J Behrens
(74) *Attorney, Agent, or Firm* — Nixon Peabody LLP (57) ABSTRACT

An agricultural system includes a plurality of organic devices for controlling weeds in a planted field, the organic devices being positioned between respective adjacent rows of planted matter in a field. Each the organic devices includes a pivotable shaft having an upper end and a lower end, and a weed-control unit attached to the lower end of the pivotable shaft. The weed-control unit includes a rotatable blade for mowing weeds growing between the adjacent rows of the planted matter. The system further includes at least one motor coupled to one or more of the organic devices for driving the rotatable blade of each weed-control unit.

8 Claims, 8 Drawing Sheets

(56) References Cited

U.S. PATENT DOCUMENTS

| | | |
|---|---|---|
| 353,491 A | 2/1886 | Wells |
| 523,508 A | 7/1894 | Bauer |
| 736,369 A | 8/1903 | Dynes |
| 803,088 A | 10/1905 | Barker |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,442,032 A * | 1/1923 | Luce .............. A01D 45/10 56/102 |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A | 12/1933 | Broemmelsick |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,878,633 A * | 3/1959 | Mullin .............. A01D 43/14 239/104 |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,082,829 A * | 3/1963 | Buddingh .............. A01B 39/08 172/142 |
| 3,110,973 A | 11/1963 | Reynolds |
| 3,115,739 A * | 12/1963 | Thoen .............. A01D 34/863 172/117 |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,256,942 A | 6/1966 | Van Sickle |
| 3,261,150 A * | 7/1966 | Fitzgerald, Sr. ...... A01D 34/863 172/305 |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,420,273 A | 1/1969 | Greer |
| 3,447,495 A | 6/1969 | Miller |
| 3,498,036 A * | 3/1970 | Cowling .............. A01D 34/863 56/10.4 |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,599,403 A * | 8/1971 | Gantz .............. A01D 34/863 56/10.4 |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,970,012 A * | 7/1976 | Jones, Sr. .............. A01B 21/04 111/118 |
| 3,975,890 A | 8/1976 | Rodger |
| 3,986,464 A | 10/1976 | Uppiano |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | van der Lely |
| 4,063,597 A | 12/1977 | Day |
| 4,096,730 A | 6/1978 | Martin |
| 4,099,576 A | 7/1978 | Jilani |
| 4,104,851 A * | 8/1978 | Perry .............. A01D 34/866 369/63 |
| 4,122,715 A | 10/1978 | Yokoyama |
| 4,129,082 A | 12/1978 | Betulius |
| 4,135,349 A * | 1/1979 | Schwertner .......... A01D 75/30 56/503 |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,294,181 A * | 10/1981 | Smith .............. A01B 39/08 111/121 |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,384,444 A * | 5/1983 | Rossler, Jr. .......... A01D 34/662 172/526 |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |

(56) References Cited

U.S. PATENT DOCUMENTS

| | | | |
|---|---|---|---|
| 4,438,710 A | 3/1984 | Paladino | |
| 4,445,445 A | 5/1984 | Sterrett | |
| 4,461,355 A | 7/1984 | Peterson | |
| 4,481,830 A | 11/1984 | Smith | |
| 4,499,775 A | 2/1985 | Lasoen | |
| 4,506,610 A | 3/1985 | Neal | |
| 4,508,178 A | 4/1985 | Cowell | |
| 4,528,920 A | 7/1985 | Neumeyer | |
| 4,530,405 A | 7/1985 | White | |
| 4,537,262 A | 8/1985 | van der Lely | |
| 4,538,688 A | 9/1985 | Szucs | |
| 4,550,122 A | 10/1985 | David | |
| 4,553,607 A | 11/1985 | Behn | |
| 4,580,506 A | 4/1986 | Fleischer | |
| 4,596,200 A | 6/1986 | Gafford | |
| 4,598,654 A | 7/1986 | Robertson | |
| 4,603,746 A | 8/1986 | Swales | |
| 4,604,906 A | 8/1986 | Scarpa | |
| 4,619,329 A | 10/1986 | Gorbett | |
| 4,630,773 A | 12/1986 | Ortlip | |
| 4,643,043 A | 2/1987 | Furuta | |
| 4,646,620 A | 3/1987 | Buchl | |
| 4,646,850 A | 3/1987 | Brown | |
| 4,650,005 A | 3/1987 | Tebben | |
| 4,669,550 A | 6/1987 | Sittre | |
| 4,671,193 A | 6/1987 | States | |
| 4,674,578 A | 6/1987 | Bexten | |
| 4,703,809 A | 11/1987 | Van den Ende | |
| 4,726,304 A | 2/1988 | Dreyer | |
| 4,738,461 A | 4/1988 | Stephenson | |
| 4,744,316 A | 5/1988 | Lienemann | |
| 4,762,075 A | 8/1988 | Halford | |
| 4,765,190 A | 8/1988 | Strubbe | |
| 4,768,387 A | 9/1988 | Kemp | |
| 4,776,404 A | 10/1988 | Rogers | |
| 4,779,684 A | 10/1988 | Schultz | |
| 4,785,890 A | 11/1988 | Martin | |
| 4,825,957 A | 5/1989 | White | |
| 4,825,959 A | 5/1989 | Wilhelm | |
| 4,920,901 A | 5/1990 | Pounds | |
| 4,926,622 A * | 5/1990 | McKee | A01D 43/14 56/16.8 |
| 4,926,767 A | 5/1990 | Thomas | |
| 4,930,431 A | 6/1990 | Alexander | |
| 4,986,367 A | 1/1991 | Kinzenbaw | |
| 4,987,841 A | 1/1991 | Rawson | |
| 4,998,488 A | 3/1991 | Hansson | |
| 5,015,997 A | 5/1991 | Strubbe | |
| 5,027,525 A | 7/1991 | Haukaas | |
| 5,033,397 A | 7/1991 | Colburn, Jr. | |
| 5,065,632 A | 11/1991 | Reuter | |
| 5,074,227 A | 12/1991 | Schwitters | |
| 5,076,180 A | 12/1991 | Schneider | |
| 5,092,255 A | 3/1992 | Long | |
| 5,113,957 A | 5/1992 | Tamai | |
| 5,129,282 A | 7/1992 | Bassett | |
| 5,136,934 A | 8/1992 | Darby, Jr. | |
| 5,190,112 A | 3/1993 | Johnston | |
| 5,224,553 A | 7/1993 | Heintzman | |
| 5,234,060 A | 8/1993 | Carter | |
| 5,240,080 A | 8/1993 | Bassett | |
| 5,255,617 A | 10/1993 | Williams | |
| 5,269,237 A | 12/1993 | Baker | |
| 5,282,389 A | 2/1994 | Faivre | |
| 5,285,854 A | 2/1994 | Thacker | |
| 5,333,694 A | 8/1994 | Roggenbuck | |
| 5,337,832 A | 8/1994 | Bassett | |
| 5,341,754 A | 8/1994 | Winterton | |
| 5,346,019 A | 9/1994 | Kinzenbaw | |
| 5,346,020 A | 9/1994 | Bassett | |
| 5,349,911 A | 9/1994 | Holst | |
| 5,351,635 A | 10/1994 | Hulicsko | |
| 5,379,847 A | 1/1995 | Snyder | |
| 5,394,946 A | 3/1995 | Clifton | |
| 5,398,771 A | 3/1995 | Hornung | |
| 5,419,402 A | 5/1995 | Heintzman | |
| 5,427,192 A | 6/1995 | Stephenson | |
| 5,443,023 A | 8/1995 | Carroll | |
| 5,443,125 A | 8/1995 | Clark | |
| 5,461,995 A | 10/1995 | Winterton | |
| 5,462,124 A | 10/1995 | Rawson | |
| 5,473,999 A | 12/1995 | Rawson | |
| 5,474,135 A | 12/1995 | Schlagel | |
| 5,477,682 A | 12/1995 | Tobiasz | |
| 5,477,792 A | 12/1995 | Bassett | |
| 5,479,868 A | 1/1996 | Bassett | |
| 5,479,992 A | 1/1996 | Bassett | |
| 5,485,796 A | 1/1996 | Bassett | |
| 5,485,886 A | 1/1996 | Bassett | |
| 5,497,717 A | 3/1996 | Martin | |
| 5,497,837 A | 3/1996 | Kehrney | |
| 5,499,683 A | 3/1996 | Bassett | |
| 5,499,685 A | 3/1996 | Downing, Jr. | |
| 5,517,932 A | 5/1996 | Ott | |
| 5,524,525 A | 6/1996 | Nikkel | |
| 5,531,171 A | 7/1996 | Whitesel | |
| 5,542,362 A | 8/1996 | Bassett | |
| 5,544,709 A | 8/1996 | Lowe | |
| 5,562,165 A | 10/1996 | Janelle | |
| 5,590,611 A | 1/1997 | Smith | |
| 5,603,269 A | 2/1997 | Bassett | |
| 5,623,997 A | 4/1997 | Rawson | |
| 5,640,914 A | 6/1997 | Rawson | |
| 5,657,707 A | 8/1997 | Dresher | |
| 5,660,126 A | 8/1997 | Freed | |
| 5,685,245 A | 11/1997 | Bassett | |
| 5,704,430 A | 1/1998 | Smith | |
| 5,709,271 A | 1/1998 | Bassett | |
| 5,725,057 A | 3/1998 | Taylor | |
| 5,727,638 A | 3/1998 | Wodrich | |
| 5,809,757 A | 9/1998 | McLean | |
| 5,852,982 A | 12/1998 | Peter | |
| 5,868,207 A | 2/1999 | Langbakk | |
| 5,878,678 A | 3/1999 | Stephens | |
| RE36,243 E | 7/1999 | Rawson | |
| 5,953,895 A | 9/1999 | Hobbs | |
| 5,970,891 A | 10/1999 | Schlagel | |
| 5,970,892 A | 10/1999 | Wendling | |
| 5,988,293 A | 11/1999 | Brueggen | |
| 6,067,918 A | 5/2000 | Kirby | |
| 6,068,061 A | 5/2000 | Smith | |
| 6,091,997 A | 7/2000 | Flamme | |
| 6,145,288 A * | 11/2000 | Tamian | A01C 23/00 56/16.4 A |
| 6,164,385 A | 12/2000 | Buchl | |
| 6,176,334 B1 | 1/2001 | Lorenzen | |
| 6,223,663 B1 | 5/2001 | Wendling | |
| 6,223,828 B1 | 5/2001 | Paulson | |
| 6,237,696 B1 | 5/2001 | Mayerle | |
| 6,253,692 B1 | 7/2001 | Wendling | |
| 6,314,897 B1 | 11/2001 | Hagny | |
| 6,325,156 B1 | 12/2001 | Barry | |
| 6,330,922 B1 | 12/2001 | King | |
| 6,331,142 B1 | 12/2001 | Bischoff | |
| 6,343,661 B1 | 2/2002 | Thomspon | |
| 6,347,594 B1 | 2/2002 | Wendling | |
| 6,382,326 B1 | 5/2002 | Goins | |
| 6,389,999 B1 | 5/2002 | Duello | |
| 6,453,832 B1 | 9/2002 | Schaffert | |
| 6,454,019 B1 | 9/2002 | Prairie | |
| 6,460,623 B1 | 10/2002 | Knussman | |
| 6,497,088 B1 * | 12/2002 | Holley | A01D 43/14 239/67 |
| 6,516,595 B2 | 2/2003 | Rhody | |
| 6,526,735 B2 * | 3/2003 | Meyer | A01D 75/303 56/6 |
| 6,530,334 B2 | 3/2003 | Hagny | |
| 6,575,104 B2 | 6/2003 | Brummelhuis | |
| 6,644,224 B1 | 11/2003 | Bassett | |
| 6,681,868 B2 | 1/2004 | Kovach | |
| 6,701,856 B1 | 3/2004 | Zoke | |
| 6,701,857 B1 | 3/2004 | Jensen | |
| 6,715,433 B1 | 4/2004 | Friestad | |
| 6,786,130 B2 | 9/2004 | Steinlage | |

(56) References Cited

U.S. PATENT DOCUMENTS

| | | | |
|---|---|---|---|
| 6,834,598 B2 | 12/2004 | Jüptner | |
| 6,840,853 B2 | 1/2005 | Foth | |
| 6,886,650 B2 | 5/2005 | Bremmer | |
| 6,908,052 B1 * | 6/2005 | Jacobson | A01D 43/14 239/146 |
| 6,912,963 B2 | 7/2005 | Bassett | |
| 6,968,907 B1 | 11/2005 | Raper | |
| 6,986,313 B2 | 1/2006 | Halford | |
| 6,997,400 B1 | 2/2006 | Hanna | |
| 7,004,090 B2 | 2/2006 | Swanson | |
| 7,044,070 B2 | 5/2006 | Kaster | |
| 7,063,167 B1 | 6/2006 | Staszak | |
| 7,159,523 B2 | 1/2007 | Bourgault | |
| 7,163,227 B1 | 1/2007 | Burns | |
| 7,222,575 B2 | 5/2007 | Bassett | |
| 7,249,448 B2 * | 7/2007 | Murphy | A01D 47/00 56/15.8 |
| 7,290,491 B2 | 11/2007 | Summach | |
| 7,325,756 B1 | 2/2008 | Giorgis | |
| 7,347,036 B1 * | 3/2008 | Easley, Jr. | A01D 75/30 172/313 |
| 7,360,494 B2 | 4/2008 | Martin | |
| 7,360,495 B1 | 4/2008 | Martin | |
| 7,438,006 B2 | 10/2008 | Mariman | |
| 7,451,712 B2 | 11/2008 | Bassett | |
| 7,523,709 B1 | 4/2009 | Kiest | |
| 7,540,333 B2 | 6/2009 | Bettin | |
| 7,575,066 B2 | 8/2009 | Bauer | |
| 7,584,707 B2 | 9/2009 | Sauder | |
| 7,665,539 B2 | 2/2010 | Bassett | |
| 7,673,570 B1 | 3/2010 | Bassett | |
| 7,743,718 B2 | 6/2010 | Bassett | |
| 7,870,827 B2 | 1/2011 | Bassett | |
| 7,900,429 B2 * | 3/2011 | Labar | A01D 34/733 56/16.8 |
| 7,918,285 B1 | 4/2011 | Graham | |
| 7,938,074 B2 | 5/2011 | Liu | |
| 7,944,210 B2 | 5/2011 | Fischer | |
| 7,946,231 B2 | 5/2011 | Martin | |
| 8,146,519 B2 | 4/2012 | Bassett | |
| 8,151,717 B2 | 4/2012 | Bassett | |
| 8,171,707 B2 | 5/2012 | Kitchel | |
| D663,326 S | 7/2012 | Allensworth | |
| 8,327,780 B2 | 12/2012 | Bassett | |
| 8,359,988 B2 | 1/2013 | Bassett | |
| 8,380,356 B1 | 2/2013 | Zielke | |
| 8,386,137 B2 | 2/2013 | Sauder | |
| 8,393,407 B2 | 3/2013 | Freed | |
| 8,408,149 B2 | 4/2013 | Rylander | |
| 8,544,397 B2 | 10/2013 | Bassett | |
| 8,544,398 B2 | 10/2013 | Bassett | |
| 8,550,020 B2 | 10/2013 | Sauder | |
| 8,573,319 B1 | 11/2013 | Casper | |
| 8,634,992 B2 | 1/2014 | Sauder | |
| 8,636,077 B2 | 1/2014 | Bassett | |
| 8,649,930 B2 | 2/2014 | Reeve | |
| 8,763,713 B2 | 7/2014 | Bassett | |
| 8,770,308 B2 | 7/2014 | Bassett | |
| 8,776,702 B2 | 7/2014 | Bassett | |
| RE45,091 E | 8/2014 | Bassett | |
| 8,863,857 B2 | 10/2014 | Bassett | |
| 8,910,581 B2 | 12/2014 | Bassett | |
| 8,985,232 B2 | 3/2015 | Bassett | |
| 9,003,983 B2 | 4/2015 | Roth | |
| 9,055,712 B2 | 6/2015 | Bassett | |
| 9,107,337 B2 | 8/2015 | Bassett | |
| 9,107,338 B2 | 8/2015 | Bassett | |
| 9,113,589 B2 | 8/2015 | Bassett | |
| 9,144,187 B2 | 9/2015 | Bassett | |
| 9,167,740 B2 | 10/2015 | Bassett | |
| 9,192,089 B2 | 11/2015 | Bassett | |
| 9,192,091 B2 | 11/2015 | Bassett | |
| 9,215,838 B2 | 12/2015 | Bassett | |
| 9,215,839 B2 | 12/2015 | Bassett | |
| 9,226,440 B2 | 1/2016 | Bassett | |
| 9,232,687 B2 | 1/2016 | Bassett | |
| 9,241,438 B2 | 1/2016 | Bassett | |
| 9,271,437 B2 | 3/2016 | Martin | |
| 9,307,690 B2 | 4/2016 | Bassett | |
| 9,392,743 B2 * | 7/2016 | Camacho-Cook | A01B 69/008 |
| 9,504,195 B2 | 11/2016 | Bassett | |
| 2002/0162492 A1 | 11/2002 | Juptner | |
| 2004/0005929 A1 | 1/2004 | Piasecki | |
| 2004/0148917 A1 * | 8/2004 | Eastwood | A01D 75/306 56/6 |
| 2005/0000202 A1 * | 1/2005 | Scordilis | A01D 34/863 56/14.7 |
| 2006/0102058 A1 | 5/2006 | Swanson | |
| 2006/0191695 A1 | 8/2006 | Walker et al. | |
| 2006/0237203 A1 | 10/2006 | Miskin | |
| 2007/0044694 A1 | 3/2007 | Martin | |
| 2007/0272134 A1 | 11/2007 | Baker | |
| 2008/0093093 A1 | 4/2008 | Sheppard | |
| 2008/0173220 A1 | 7/2008 | Wuertz | |
| 2008/0236461 A1 | 10/2008 | Sauder | |
| 2008/0256916 A1 | 10/2008 | Vaske | |
| 2010/0019471 A1 | 1/2010 | Ruckle | |
| 2010/0108336 A1 | 5/2010 | Thomson | |
| 2010/0180695 A1 | 7/2010 | Sauder | |
| 2010/0198529 A1 | 8/2010 | Sauder | |
| 2010/0282480 A1 | 11/2010 | Breker | |
| 2011/0247537 A1 | 10/2011 | Freed | |
| 2011/0313575 A1 | 12/2011 | Kowalchuk | |
| 2012/0167809 A1 | 7/2012 | Bassett | |
| 2012/0186216 A1 | 7/2012 | Vaske | |
| 2012/0216731 A1 | 8/2012 | Schilling | |
| 2012/0232691 A1 | 9/2012 | Green | |
| 2012/0255475 A1 | 10/2012 | Mariman | |
| 2013/0032363 A1 | 2/2013 | Curry | |
| 2013/0112121 A1 | 5/2013 | Achen | |
| 2013/0112124 A1 | 5/2013 | Bergen | |
| 2013/0213676 A1 | 8/2013 | Bassett | |
| 2013/0325267 A1 | 12/2013 | Adams | |
| 2013/0333599 A1 | 12/2013 | Bassett | |
| 2014/0026748 A1 | 1/2014 | Stoller | |
| 2014/0034339 A1 | 2/2014 | Sauder | |
| 2014/0034343 A1 | 2/2014 | Sauder | |
| 2014/0034344 A1 | 2/2014 | Bassett | |
| 2014/0165527 A1 | 6/2014 | Oehler | |
| 2014/0190712 A1 | 7/2014 | Bassett | |
| 2014/0197249 A1 | 7/2014 | Roth | |
| 2014/0224513 A1 | 8/2014 | Van Buskirt | |
| 2014/0224843 A1 | 8/2014 | Rollenhagen | |
| 2014/0278696 A1 | 9/2014 | Anderson | |
| 2015/0216108 A1 | 8/2015 | Roth | |
| 2015/0237791 A1 | 8/2015 | Bassett | |
| 2015/0373901 A1 | 12/2015 | Bassett | |
| 2016/0066498 A1 | 3/2016 | Bassett | |
| 2016/0100520 A1 | 4/2016 | Bassett | |
| 2016/0128263 A1 | 5/2016 | Bassett | |
| 2016/0128265 A1 | 5/2016 | Bassett | |
| 2016/0198623 A1 | 7/2016 | Bassett | |
| 2017/0034985 A1 | 2/2017 | Martin | |
| 2017/0127614 A1 * | 5/2017 | Button | A01D 34/005 |
| 2017/0303467 A1 * | 10/2017 | Simmons | A01D 34/416 |
| 2018/0007834 A1 * | 1/2018 | Martin | A01D 75/303 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| DE | 3830141 | * 2/1990 | A01D 34/66 |
| EP | 2 196 337 B1 | 6/2010 | |
| EP | 2 497 348 A1 | 9/2012 | |
| GB | 1 574 412 | 9/1980 | |
| GB | 2 056 238 A | 10/1982 | |
| GB | 2 160 401 A | 12/1985 | |
| JP | 54-57726 | 5/1979 | |
| SU | 392897 | 8/1973 | |
| SU | 436778 | 7/1974 | |
| SU | 611201 | 6/1978 | |
| SU | 625648 | 9/1978 | |
| SU | 1410884 A1 | 7/1988 | |

(56) References Cited

FOREIGN PATENT DOCUMENTS

| SU | 1466674 | 3/1989 |
|---|---|---|
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |
| WO | WO 2016/073964 A1 | 5/2016 |
| WO | WO 2016/073966 A1 | 5/2016 |

OTHER PUBLICATIONS

Case Corporation Brochure, Planters 900 Series Units/Modules Product Information, Aug. 1986 (4 pages).
Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "New Efficiencies in Nitrogen Application," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "Sky Spy: Gulf War Technology Pinpoints Field and Yields," Top Producer, A Farm Journal Publication, Nov. 1991, pp. 12-14 (4 pages).
Borgelt, Steven C., "Sensor Technologies and Control Strategies for Managing Variability," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "Listen to Your Soil," Farm Journal Article, Jan. 1993, pp. 14-15 (2 pages).
Acu-Grain, "Combine Yield Monitor 99% Accurate? 'You Bet Your Bushels!!'" date estimated as early as Feb. 1993 (2 pages).
John Deere, New 4435 Hydro Row-Crop and Small-Grain Combine, date estimated as early as Feb. 1993 (8 pages).
Vansichen, R. et al., "Continuous Wheat Yield Measurement on a Combine," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13" Spading Closing Wheels Brochure, date estimated as early as Jun. 6, 2012, pp. 18-25 (8 pages).
Vogt, Willie, "Revisiting Robotics," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

\* cited by examiner

AGRICULTURAL ORGANIC DEVICE FOR WEED CONTROL

CROSS-REFERENCE TO RELATED APPLICATIONS

This application claims the benefit of and priority to U.S. Provisional Patent Application No. 62/271,770 titled "Agricultural Organic Device For Weed Control," filed on Dec. 28, 2015, which is incorporated herein by reference in its respective entirety.

FIELD OF THE INVENTION

The present invention relates generally to agricultural equipment and, more particularly, to a system with a device for controlling weeds between adjacent rows in a field.

SUMMARY OF THE INVENTION

In accordance with one embodiment, an organic device attaches to a sprayer agricultural unit that allows mowing down weeds and delivering weed-control and other substances between rows of planted matters, such as corn, soybeans, etc., in an agricultural field.

In accordance with another embodiment, an agricultural system includes a plurality of organic devices for controlling weeds in a planted field, the organic devices being positioned between respective adjacent rows of planted matter in a field. Each the organic devices includes a pivotable shaft having an upper end and a lower end, and a weed-control unit attached to the lower end of the pivotable shaft. The weed-control unit includes a rotatable blade for mowing weeds growing between the adjacent rows of the planted matter. The system further includes at least one motor coupled to one or more of the organic devices for driving the rotatable blade of each weed-control unit.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
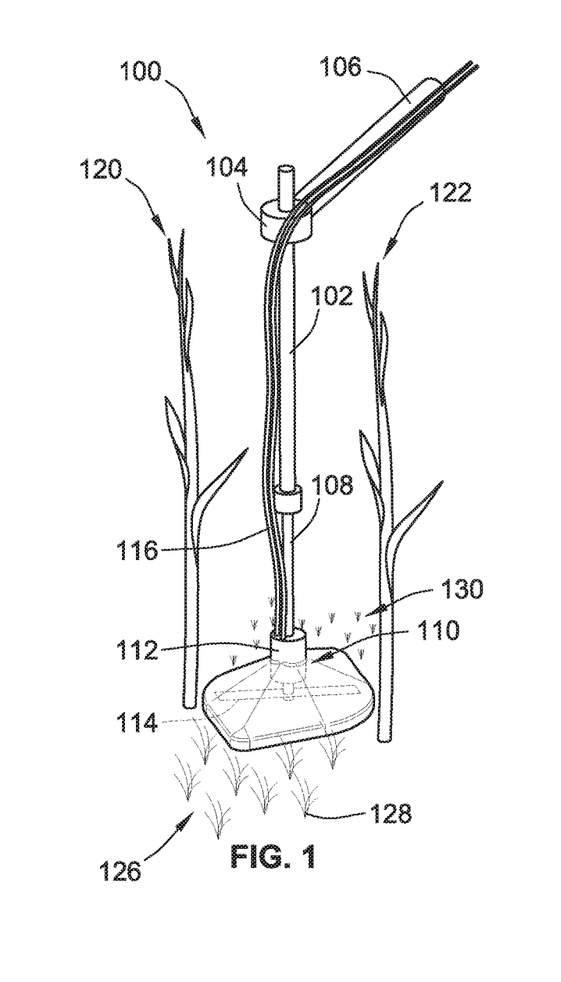
FIG. 1 is a perspective view illustrating an organic device with a single weed-control unit and a single motor.

Turning now to the drawings and referring initially to FIG. 1, an organic device 100 is attachable to an agricultural towing vehicle, e.g., a tractor, for mowing and/or spraying weeds located between rows in a field of planted matter. The device 100 includes a vertically adjustable shaft 102 that is attached, at an upper end 104, to the towing vehicle via an attachment link 106 and, at a lower end 108, to a weed-control unit 110. The weed-control unit 110 includes a dedicated motor 112 and a rotatable cutting blade 114. By way of example, the motor 112 is a hydraulic or electric motor. The device 100 further includes a sprayer input with one or more sprayer input tubes 116 that are coupled to and end in the weed-control unit 110 for delivering weed-control and/or other substances.

The device 100 is advanced through adjacent rows of planted matter, such as a left row 120 and the right row 122 of plants 124 in a field 126. As the device 100 is advanced, it mows down growing weeds 128 with the cutting blade 114 to clear a reduced or weed-free path 130 between the rows 120, 122. In addition to, or instead of, the mowing achieved by the cutting blade 114, the device 100 further outputs one or more weed-control substances from the sprayer input tubes 116. The weed-control substance are helpful in reducing and/or preventing the reappearance of weeds in the path 130.

Figure 2:
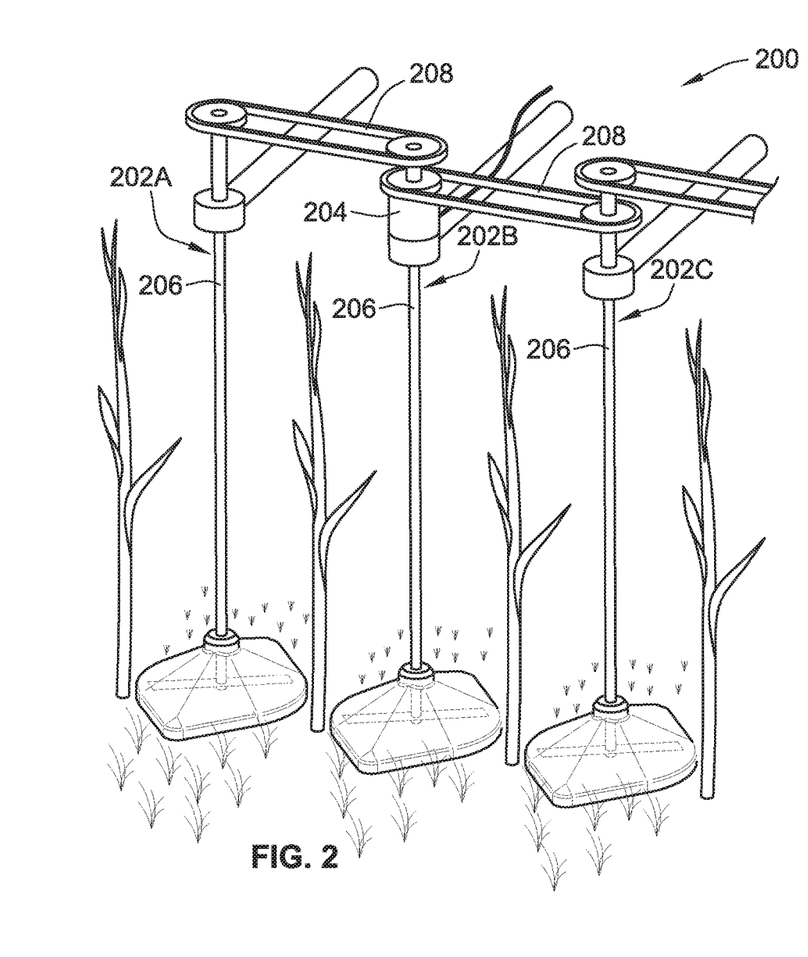
FIG. 2 is a perspective view illustrating an agricultural system with multiple weed-control units driven by a single motor.

Referring to FIG. 2, an agricultural system 200 includes multiple organic devices 202 driven by a single motor 204. The organic devices 202 include a left device 202A, a center device 202B, and a right device 202C, which each device having a respective shaft 206. In this example, the shaft 206 has a fixed height, with all the devices 202 having the same height.

The motor 204 is mounted to an upper end of the shaft 206 of the center device 202B. In turn, each upper end of the left and right devices 202A, 202C is coupled via a respective rotating belt 208 to the center device 202B. As such, the single motor 204 drives simultaneously each of the devices 202.

Figure 3:
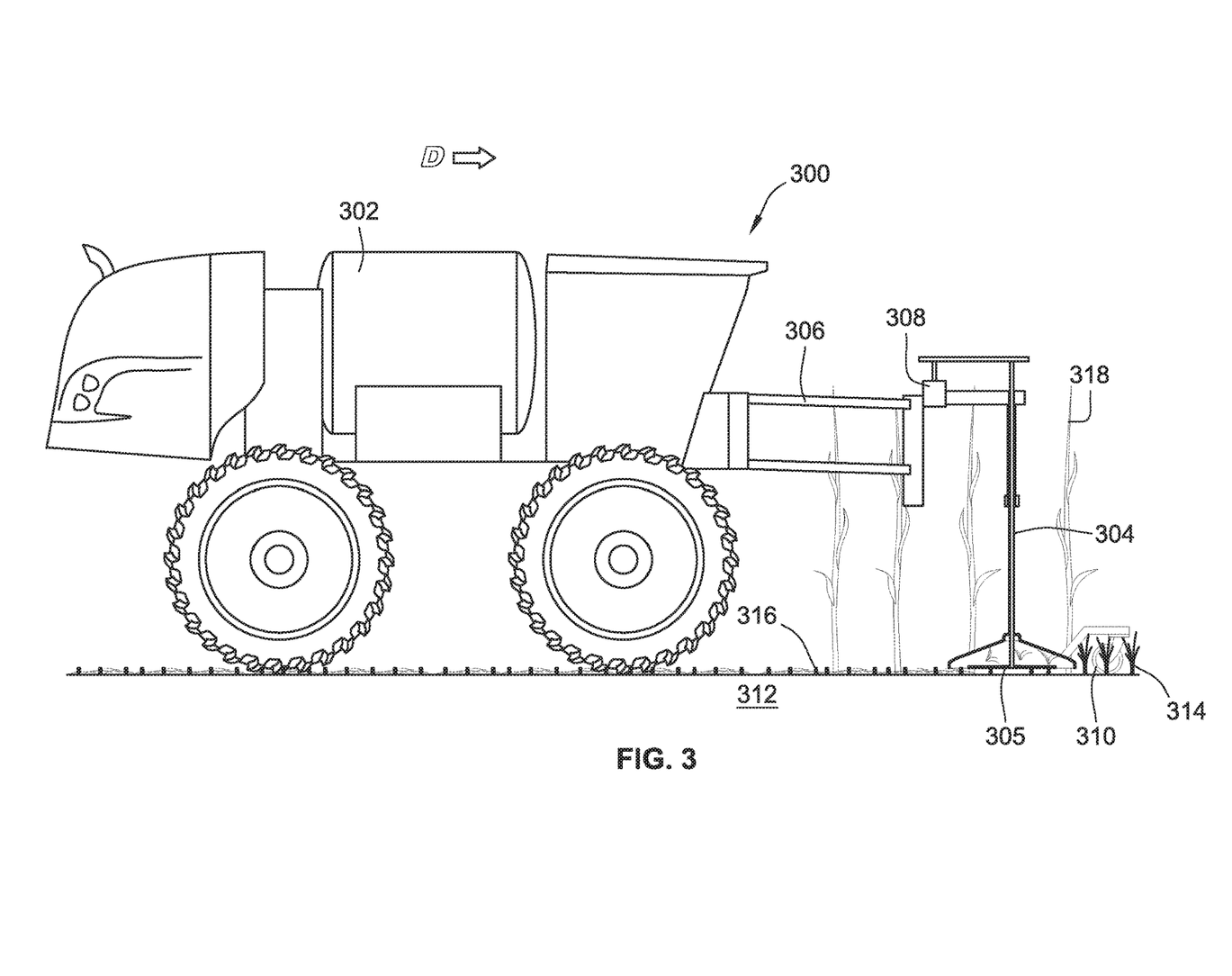
FIG. 3 is a side view illustrating an agricultural system with an agricultural vehicle attached to a weed-control unit having a single motor and a front gauge wheel.

Referring to FIG. 3, an agricultural system 300 has an agricultural vehicle 302 that is attached to an organic device 304 via a frame linkage 306. The device 304 has a weed-control unit 305, a single motor 308, and a front gauge wheel 310. As the device 304 advances in a direction D along a field 312, growing weeds 314 are mowed and/or treated with weed-control substances to achieve a generally weed-free or reduced-weed path 316 between the rows of planted matter 318.

Figure 4:
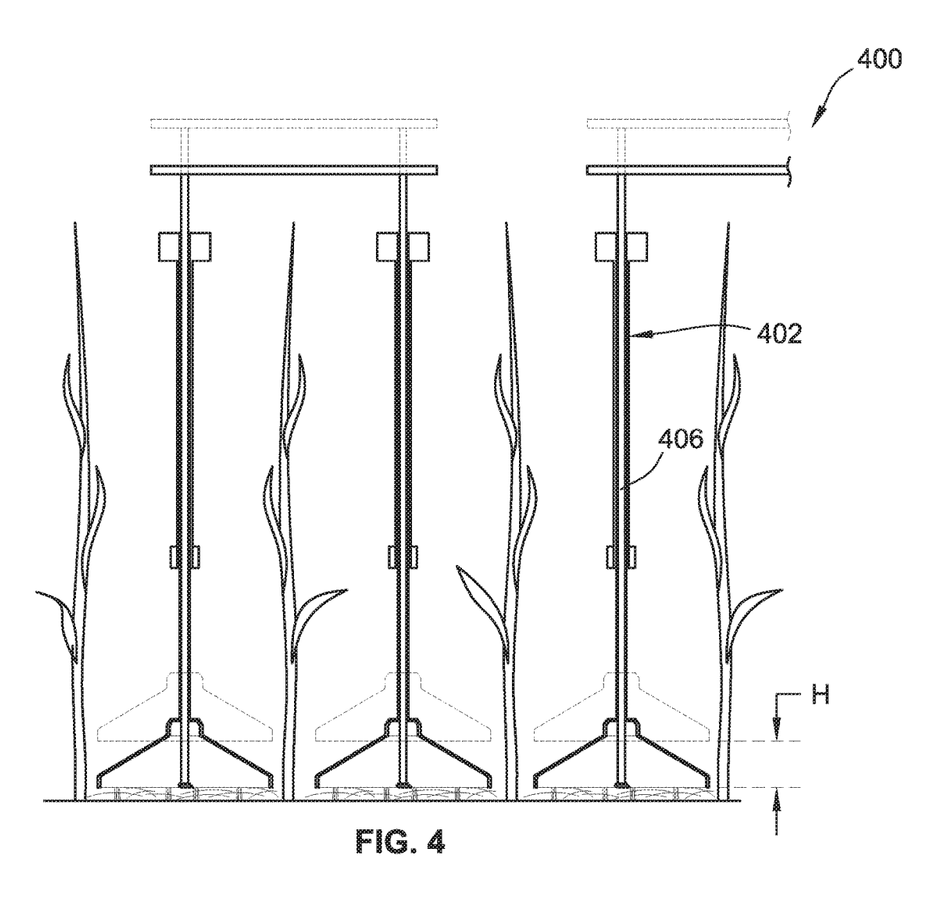
FIG. 4 is a rear view illustrating height adjustment of weed-control units.

Referring to FIG. 4, an agricultural system 400 has a plurality of organic devices 402 with respective weed-control units 404 and adjustable shafts 406. The shafts 406 are adjustable, having an H range of positions, in accordance with a weed height present in the field. As applicable, the devices 402 are generally similar (but not necessarily identical) to and include one or more components of the devices 100, 202, 304 described above and illustrated in FIGS. 1-3.

Figure 5:
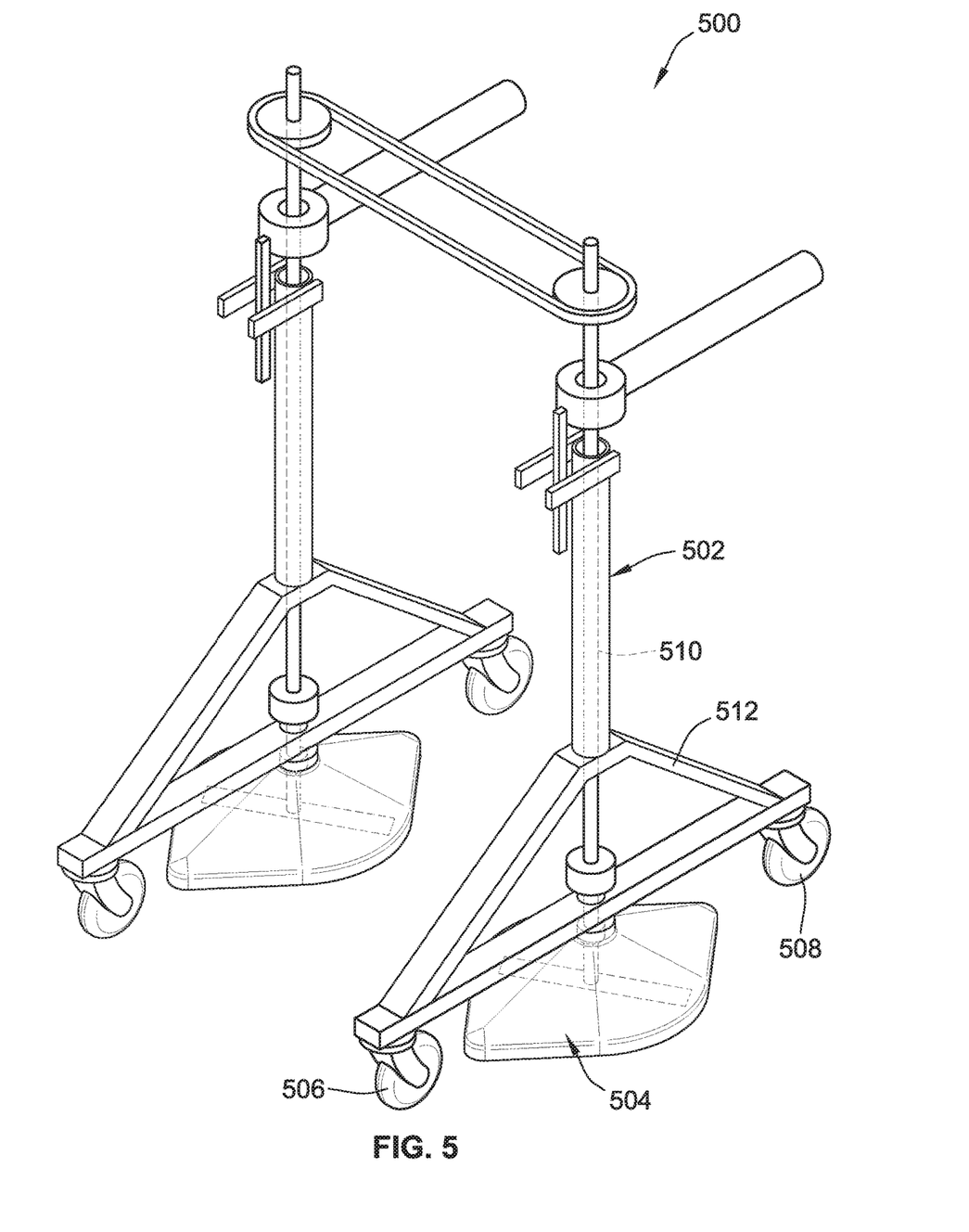
FIG. 5 is a perspective view illustrating weed-control units with front and rear gauge wheels.

Referring to FIG. 5, an agricultural system 500 has a plurality of organic devices 502 with respective weed-control units 504. Each device 502 has a pair of gauge wheels that includes a front gauge wheel 506 and a rear gauge wheel 508. The gauge wheels 506, 508 are mounted to a shaft 510 via a gauge frame 512.

Figure 6:
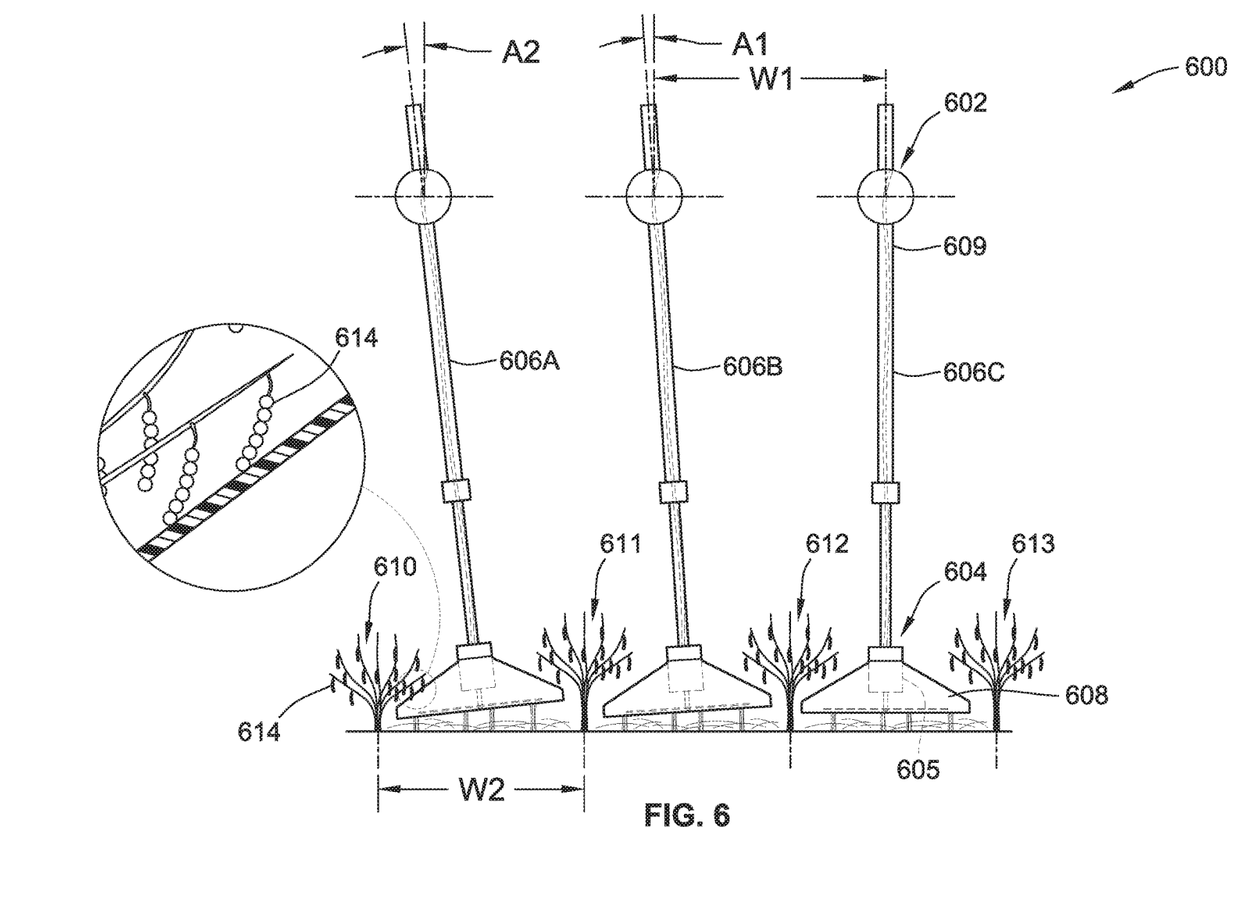
FIG. 6 is a rear view illustrating pivoting movement of weed-control units.

Referring to FIG. 6, an agricultural system 600 has a plurality of pivotable organic devices 602 with respective weed-control units 604 and motors 605. The weed-control units 604 are attached to lower ends of respective shafts 606, which include an outer protective shield 608 and an internal substance-insertion tube 609. The shafts 606 are independently pivotable at various angles, such as angles A1 and A2, with each shaft 606 pivoting between respective rows 610-613 of plants 614. For example a left shaft 606A pivots at an angle A2 between a first row 610 and a second row 611, while a center shaft 606B simultaneously pivots at an angle A1 between the second row 611 and a third row 612.

The pivoting feature allows the devices 602 to be spaced across rows at distances that are not necessarily the same width. For example, a right shaft 606C is spaced away from the center shaft 606B at a greater width W1 than the left shaft 606A is spaced away from the center shaft 606B (at a smaller width W2).

Figure 7:
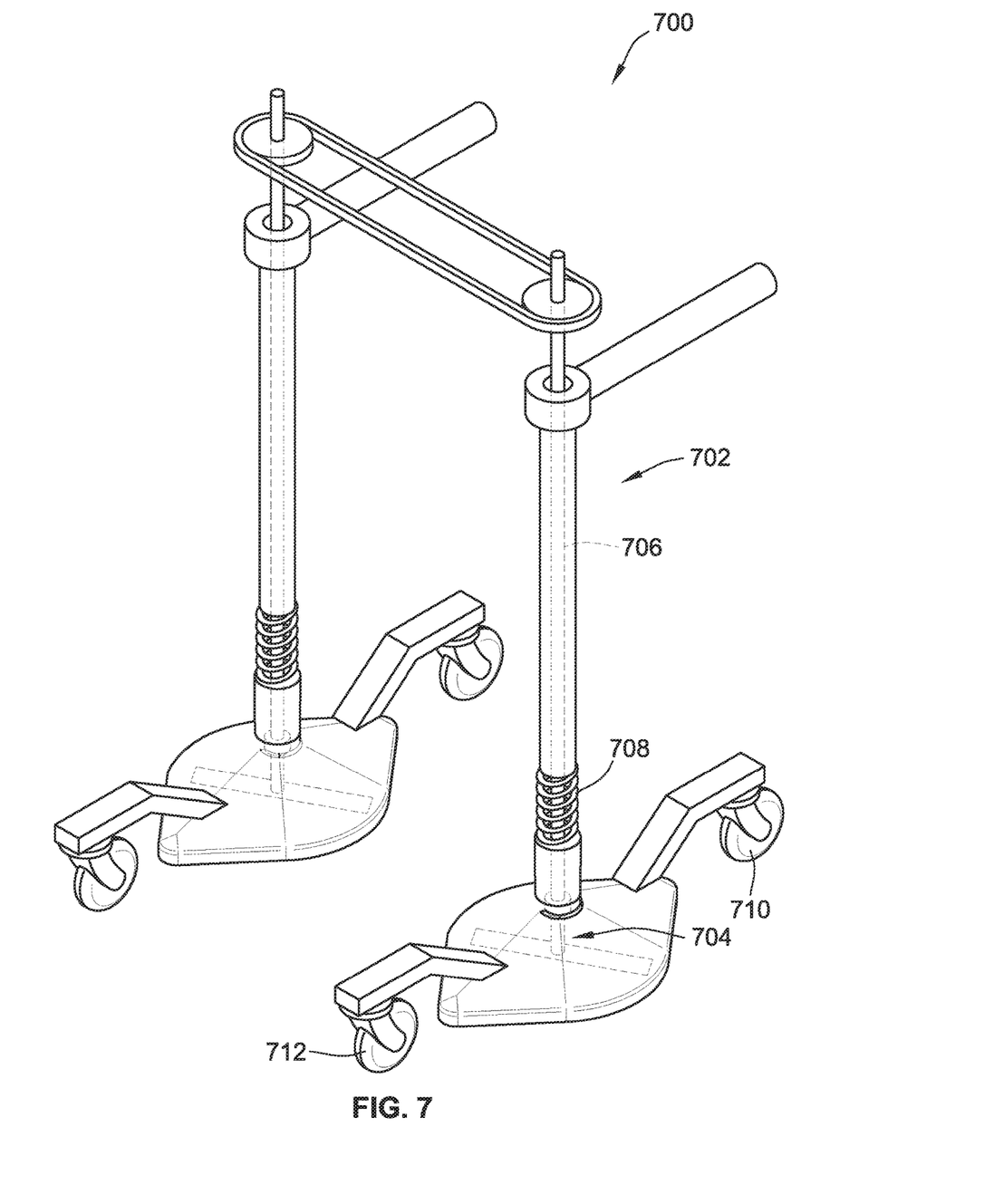
FIG. 7 is a perspective view illustrating spring-loaded weed-control units with front and rear gauge wheels.

Referring to FIG. 7, an agricultural system 700 has a plurality of organic devices 702 with respective weed-control units 704. Each organic device 702 has a shaft 706 with a spring-loaded element 708 at a lower end that is attached to the weed-control unit 704. The spring-loaded element 708 allows automatic adjustment of the weed-control unit 704 when passing over uneven terrain or weeds. The weed-control units 704 further include a pair of front and rear gauge wheels 710, 712.

Figure 8:
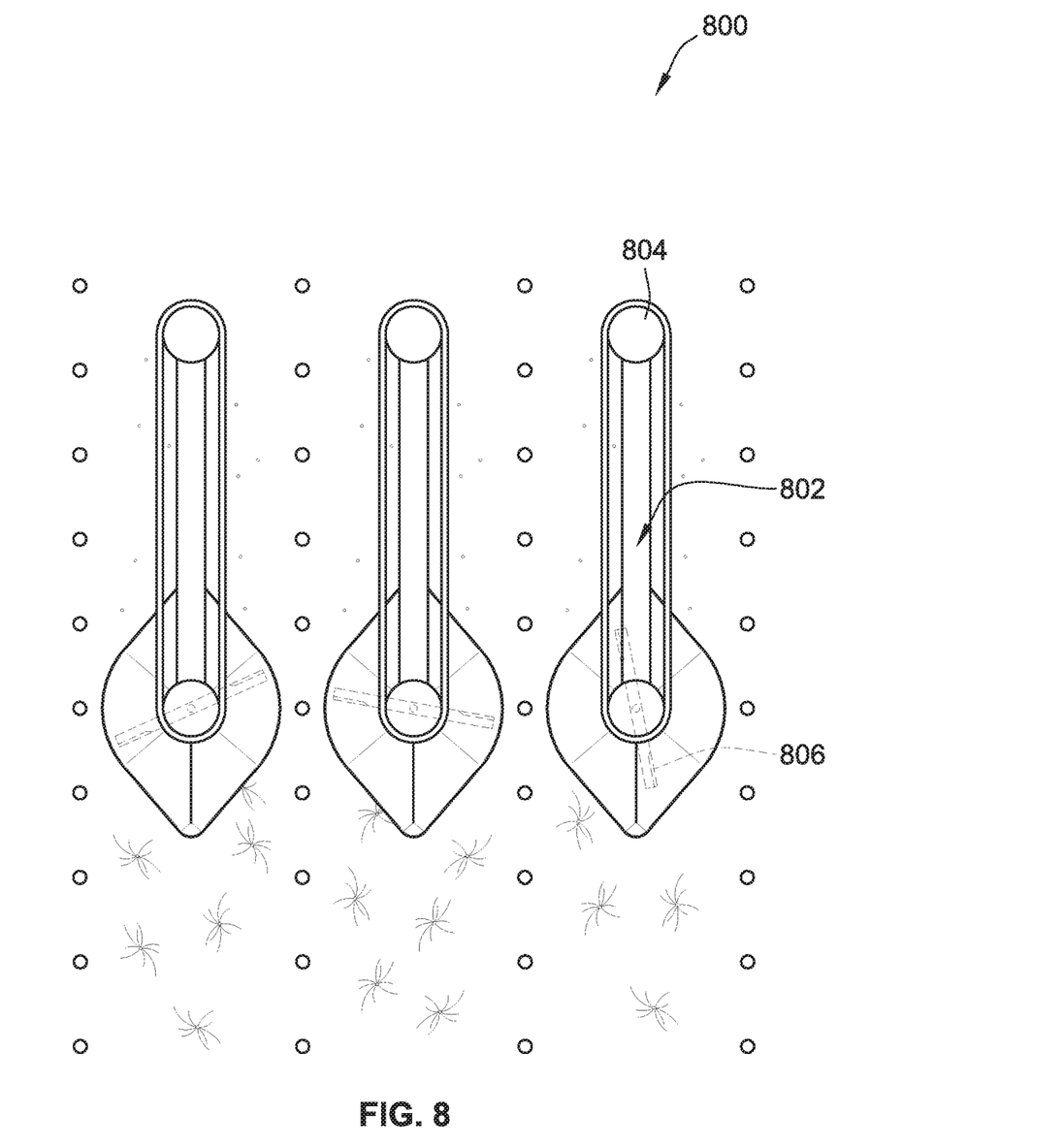
FIG. 8 is a top view illustrating single weed-control units with respective motors.

Referring to FIG. 8, an agricultural system 800 has a plurality of organic devices 802 with respective motors 804. The devices 802 have cutting blades 806 that are independently powered, respectively, by the motors 804.

Figure 9:
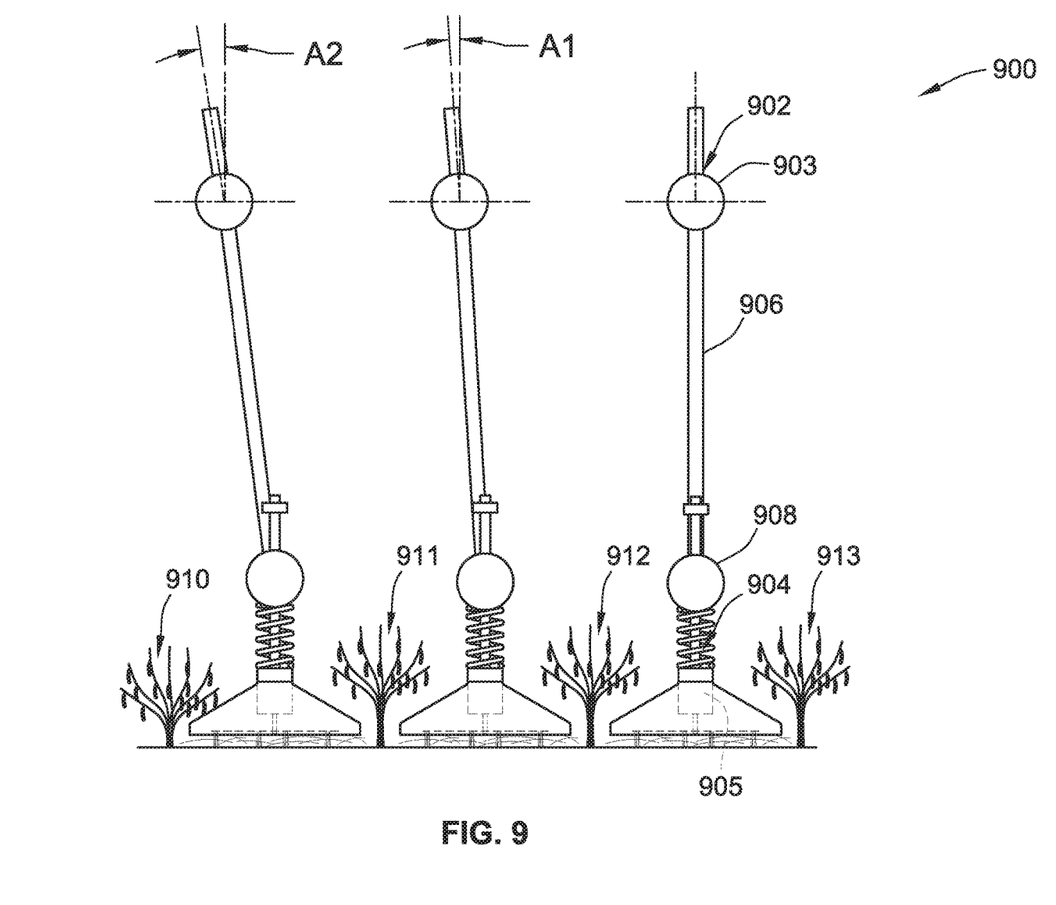
FIG. 9 is a rear view illustrating pivoting movement of weed-control units with a spring-loaded element.

Referring to FIG. 9, an agricultural system 900 has a plurality of pivotable organic devices 902 with respective weed-control units 904 and motors 905. The weed-control units 904 are attached to lower ends of respective shafts 906, which are independently pivotable at various angles (such as angles A1 and A2). A spring-loaded element 907 is mounted at the lower end of each shaft 906 allow self-adjustment of the weed-control unit 904 over uneven terrain or weeds.

The pivoting motion of the devices 902 is achieved, in part, by a top bearing element 903 and/or a bottom bearing element 908. The bottom bearing element 908, which is at a fixed distance from the top bearing element 903, allows the weed-control unit 904 to float parallel to the ground (in response to the weight of the weed-control unit 904). The height of the weed-control unit 904 is optionally maintained at a desired height via gauge wheels. Alternatively, according to another example, the height of the weed-control unit 904 is maintained via a motor drive unit mounted inside the shaft 906 or inside the bottom bearing element 908.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural system comprising:
    a frame linkage for attachment to an agricultural vehicle; and
    at least one cutting device for cutting planted matter in a planted field, the cutting device being mounted to the frame linkage and positioned between respective adjacent rows of the planted matter in the field and including
        a vertically-adjustable shaft having an upper end and a lower end, the upper end being the only portion of the at least one cutting device mounted directly to the frame linkage, and
        a cutting unit attached to the lower end of the shaft, the cutting a rotatable blade for cutting the planted matter, including weeds, growing between the adjacent rows of the planted matter, the cutting unit being attached concentrically with a vertical axis of the shaft; and
    at least one dedicated electric motor mounted to the upper end of the shaft for driving the rotatable blade of the cutting unit, the electric motor being external to the cutting unit.

2. The agricultural system of claim 1, wherein the cutting unit includes a guard within which the rotatable blade is mounted, the guard having a bottom opening through which the rotatable blade makes contact with the planted matter.

3. The agricultural system of claim 1, wherein the cutting unit has a width that is less than a row width of the adjacent rows of the planted matter.

4. The agricultural system of claim 1, further comprising at least one gauge wheel attached to the cutting unit.

5. The agricultural system of claim 4, wherein the at least one gauge wheel is mounted in a leading position of the cutting unit.

6. The agricultural system of claim 1, further comprising a sprayer input tube attached to the cutting unit for delivering a weed-control substance.

7. The agricultural system of claim 1, wherein the at least one cutting device includes a plurality of cutting devices.

8. The agricultural system of claim 7, wherein the plurality of cutting devices are commonly mounted to the frame linkage.

* * * * *

UNITED STATES PATENT AND TRADEMARK OFFICE
CERTIFICATE OF CORRECTION

PATENT NO. : 10,477,760 B2
APPLICATION NO. : 15/392731
DATED : November 19, 2019
INVENTOR(S) : Joseph D. Bassett It is certified that error appears in the above-identified patent and that said Letters Patent is hereby corrected as shown below:

In the Claims

At Column 4, Lines 23-24 (Claim 1, Lines 13-14), please delete "the cutting a rotatable blade for cutting the plant" and insert --the cutting unit including a rotatable blade for cutting the plant-- therefor.

Signed and Sealed this
Fourteenth Day of January, 2020

Andrei Iancu
*Director of the United States Patent and Trademark Office*